(12) United States Patent
Spring, Jr.

(10) Patent No.: US 6,558,029 B2
(45) Date of Patent: May 6, 2003

(54) BOAT WINDSHIELD LIGHT AND SUPPORT APPARATUS

(76) Inventor: Robert E. Spring, Jr., 15 Massasoit St., Lake Pleasant, MA (US) 01347

(*) Notice: Subject to any disclaimer, the term of this patent is extended or adjusted under 35 U.S.C. 154(b) by 56 days.

(21) Appl. No.: 09/923,066

(22) Filed: Aug. 6, 2001

(65) Prior Publication Data

US 2002/0021572 A1 Feb. 21, 2002

Related U.S. Application Data

(60) Provisional application No. 60/226,552, filed on Aug. 21, 2000.

(51) Int. Cl.$^7$ ................................................. B60Q 1/26
(52) U.S. Cl. ..................... 362/504; 362/477; 362/549; 362/396
(58) Field of Search ................. 362/477, 503, 362/504, 549, 191, 370, 396

(56) References Cited

U.S. PATENT DOCUMENTS

| | | |
|---|---|---|
| 1,481,629 A | 1/1924 | Steele |
| 1,523,924 A | 1/1925 | Weber |
| 2,960,601 A | 11/1960 | Higgins |
| 3,502,861 A | 3/1970 | Evans |
| 3,781,790 A * | 12/1973 | Dawson ...................... 362/503 |
| 5,508,895 A | 4/1996 | Wagoner, Jr. |

* cited by examiner

Primary Examiner—Stephen Husar

(57) ABSTRACT

A light support apparatus is provided for use on a windshield oriented at a windshield slope angle with respect to the horizontal and includes a bracket member which has a top bracket portion and a bottom bracket portion. A horizontal support member is connected to the top bracket portion at a bracket-to-support angle. A vertical support member is connected to the horizontal support member, and a windshield supported foot member is connected to the vertical support member at a foot-to-vertical support angle. The horizontal support member includes a fastener reception channel. Preferably, the bracket-to-support angle is substantially supplementary to the windshield slope angle, and the foot-to-vertical support angle is substantially complementary to the windshield slope angle. A light assembly is connected to the horizontal support member. The light support apparatus of the invention is especially useful on the windshield of a boat.

12 Claims, 6 Drawing Sheets

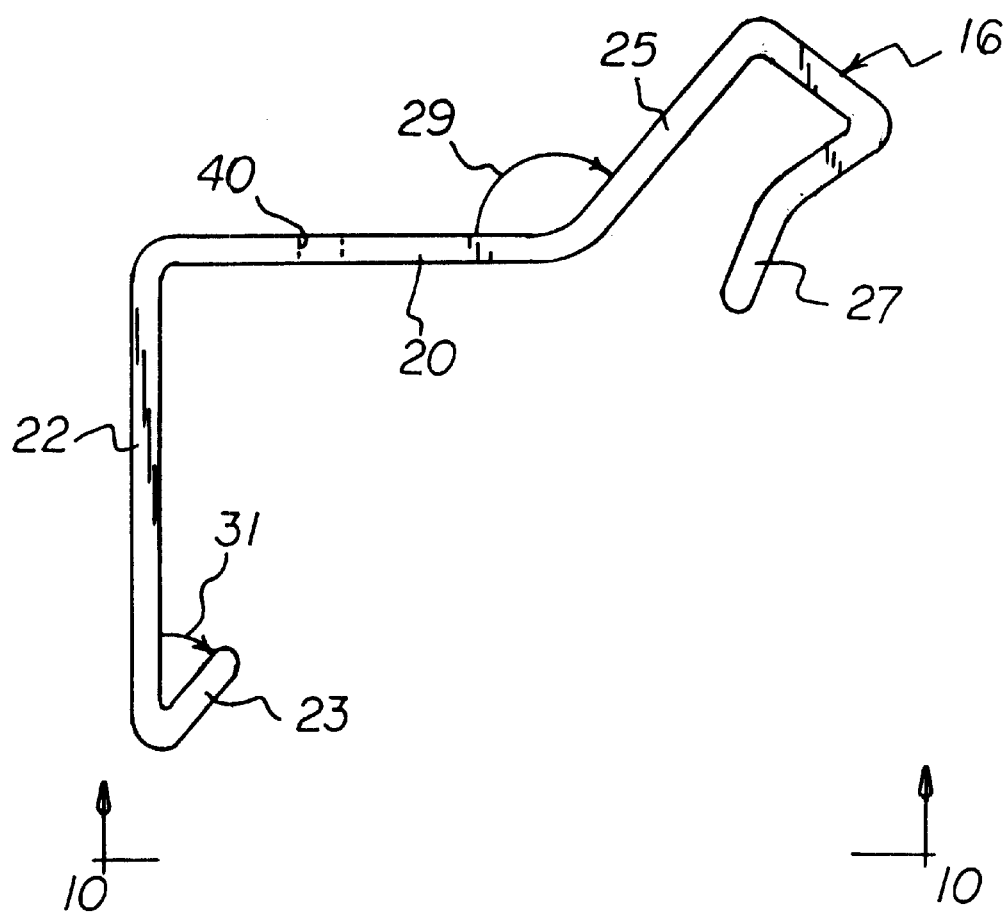
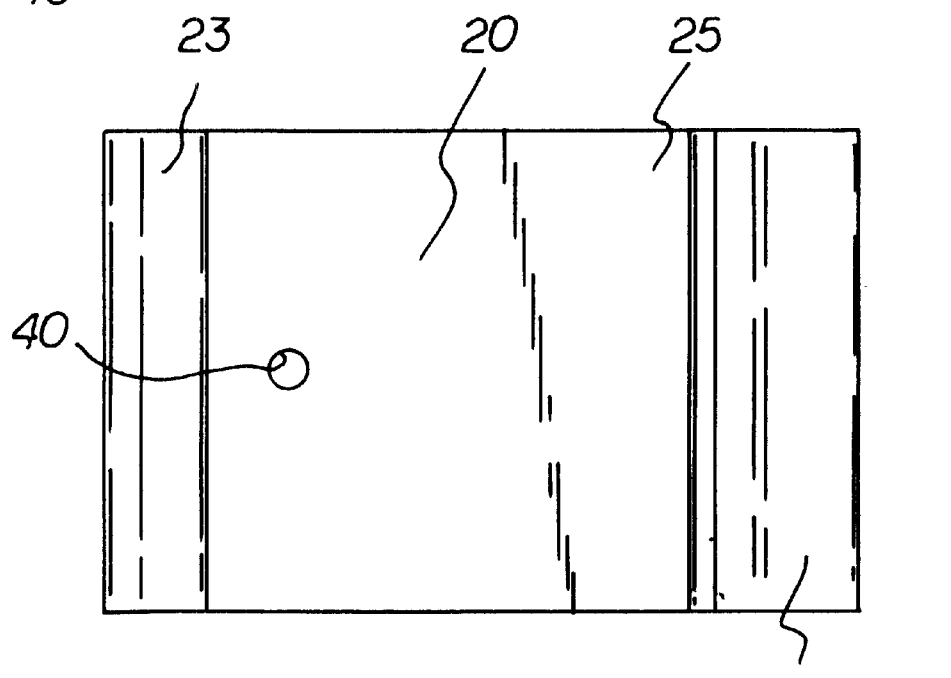

BOAT WINDSHIELD LIGHT AND SUPPORT APPARATUS

CROSS-REFERENCE TO RELATED APPLICATION

This application claims priority based upon my copending Provisional Application Ser. No. 60/226,552, filed Aug. 21, 2000.

BACKGROUND OF THE INVENTION

1. Field of the Invention

The present invention relates generally to supports for lights, and, more a particularly, to supports for lights especially adapted for use on boats.

2. Description of the Prior Art

Vehicles most often are equipped with light assemblies for casting light beams forward of the vehicle. With automobiles, such light assemblies are most commonly headlight assemblies. However, additional light assemblies, such as spotlights, are also often used on automobiles. A number of U.S. patents disclose spotlights that are attached to the tops of automobile windshields, e.g. U.S. Pat. Nos. 1,481,629 and 1,523,924. It is noted that both U.S. Pat. Nos. 1,481,629 and 1,523,924 disclose brackets for mounting a spotlight on the tops of vertically oriented automobile windshields.

Boat windshields, it is pointed out, have an acute windshield slope angle (see FIG. 1 discussed hereinbelow), and the spotlight mounting brackets disclosed U.S. Pat. Nos. 1,481,629 and 1,523,924 are not suitable for such windshields having an acute windshield slope angle. In this respect, it would be desirable is a light support apparatus were provided that is suitable for use on a windshield that has an acute windshield slope angle.

Turning to light assembly support brackets specifically disclosed for use on boats, the following U.S. patents are known: U.S. Pat. Nos. 2,960,601, 3,502,861, and 5,508,895. Each of U.S. Pat. Nos. 2,960,601, 3,502,861, and 5,508,895 discloses a respective light support bracket that is attached to the top of a wall of a boat. As a result, none of U.S. Pat. Nos. 2,960,601, 3,502,861, and 5,508,895 discloses a light support bracket that has features that provide for a light support bracket to be mounted on the top of a boat windshield that has an acute windshield slope angle. In this respect, it would be desirable if a light support bracket were provided for mounting on the top of a boat windshield that has an acute windshield slope angle.

Still other features would be desirable in a boat windshield light and support apparatus. For example, for purposes of simplicity in both use and fabrication, it would be desirable if a boat windshield light support were provided that is formed from a single piece of plastic material.

When a spotlight is used, it is most desirable that the spotlight can swivel around its support in order to direct a light beam in many directions. In this respect, it would be desirable if a boat windshield light support were provided which has a swivel for a light assembly.

To provide a firm grip on a boat windshield, it would be desirable if a boat windshield light support were provided that includes a bracket member which has resilient clamping portions.

Thus, while the foregoing body of prior art indicates it to be well known to use light support brackets for boats, the prior art described above does not teach or suggest a boat windshield light and support apparatus which has the following combination of desirable features: (1) is suitable for use on a windshield that has an acute windshield slope angle; (2) provides for mounting on the top of a boat windshield that has an acute windshield slope angle; (3) is formed from a single piece of plastic material; (4) has a swivel for a light assembly; and (5) includes a bracket member which has resilient clamping portions. The foregoing desired characteristics are provided by the unique boat windshield light and support apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a light support apparatus for use on a windshield oriented at a windshield slope angle with respect to the horizontal and includes a bracket member which has a top bracket portion and a bottom bracket portion. A horizontal support member is connected to the top bracket portion at a bracket-to-support angle. A vertical support member is connected to the horizontal support member, and a windshield supported foot member is connected to the vertical support member at a foot-to-vertical support angle. The horizontal support member includes a fastener reception channel.

Preferably, the bracket-to-support angle is substantially supplementary to the windshield slope angle, and the foot-to-vertical support angle is substantially complementary to the windshield slope angle. Preferably, the orientation angle between the horizontal support member and the vertical support member is a right angle. Preferably, the top bracket portion and the bottom bracket portion are resilient jaw members. A light assembly is connected to the horizontal support member.

The light support apparatus of the invention is especially useful on the windshield of a boat.

With one embodiment of the invention, a hypotenuse portion is connected between the windshield supported foot member and the bracket member. The hypotenuse portion is oriented to the horizontal support member at a horizontal support-orientation angle which is substantially equal to the windshield slope angle.

The light assembly can include a light swivel unit connected to the horizontal support member, and a lamp unit is connected to the light swivel unit. The light swivel unit can include a swivel bolt connected to the lamp unit. A bearing member is retained on the swivel bolt and is located between the lamp unit and the horizontal support portion. A lock nut is retained on the swivel bolt distal to the horizontal support member such that the horizontal support member is located between the lock nut and the bearing member.

A bracket-retained cushion can be supported inside the bracket member. The bracket-retained cushion receives an edge of the windshield. A windshield supported foot-to-windshield cushion can be supported by a bottom surface of the windshield supported foot member.

With one embodiment of the invention, the bracket member includes planar outer surfaces and planar inner surfaces, and the bracket-retained cushion is C-shaped, supported by the planar inner surfaces. With another embodiment of the invention, the bracket member includes convex outer surfaces and concave inner surfaces, and the bracket-retained cushion is bulbous in shape, supported by the concave inner surfaces.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least four preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved boat windshield light and support apparatus which has all of the advantages of the prior art and none of the disadvantages.

It is another object of the present invention to provide a new and improved boat windshield light and support apparatus which may be easily and efficiently manufactured and marketed.

It is a further object of the present invention to provide a new and improved boat windshield light and support apparatus which is of durable and reliable construction.

An even further object of the present invention is to provide a new and improved boat windshield light and support apparatus which is susceptible of a low cost of manufacture with regard to both materials and labor, and which accordingly is then susceptible of low prices of sale to the consuming public, thereby making such boat windshield light and support apparatus available to the buying public.

Still yet a further object of the present invention is to provide a new and improved boat windshield light and support apparatus which is suitable for use on a windshield that has an acute windshield slope angle.

Still another object of the present invention is to provide a new and improved boat windshield light and support apparatus that provides for mounting on the top of a boat windshield that has an acute windshield slope angle.

Yet another object of the present invention is to provide a new and improved boat windshield light and support apparatus which is formed from a single piece of plastic material.

Even another object of the present invention is to provide a new and improved boat windshield light and support apparatus that has a swivel for a light assembly.

Still a further object of the present invention is to provide a new and improved boat windshield light and support apparatus which includes a bracket member which has resilient clamping portions.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 9 is a side view of a fourth embodiment of the invention.

FIG. 10 is a bottom view of the embodiment of the invention of FIG. 9 taken along line 10—10 thereof.

DESCRIPTION OF THE PREFERRED EMBODIMENT

Figure 1:
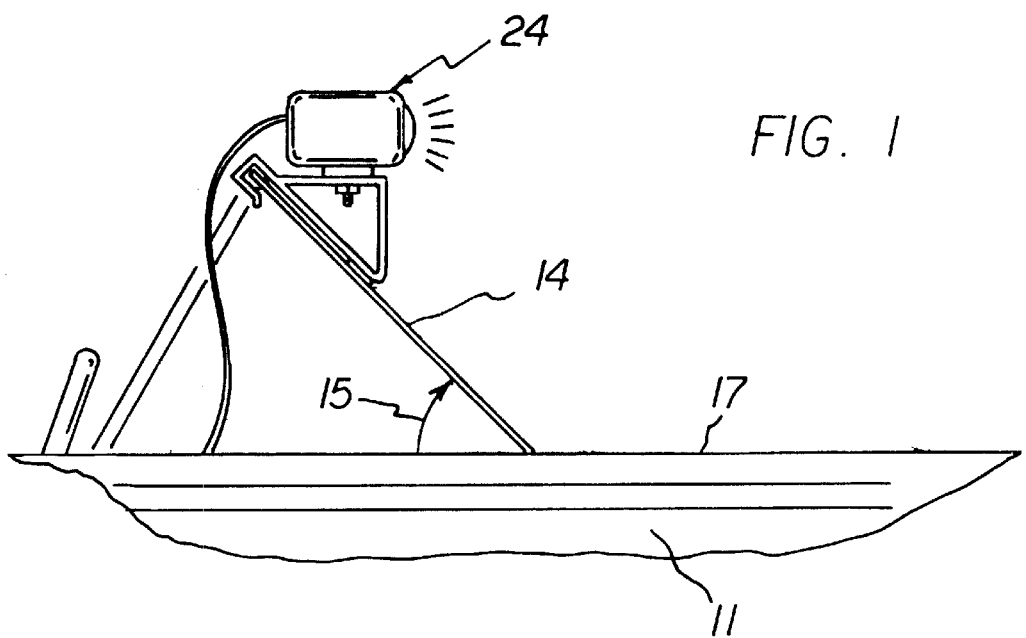
FIG. 1 is a side view showing a first embodiment of the boat windshield light and support apparatus of the invention in place on a boat windshield.
Figure 2:
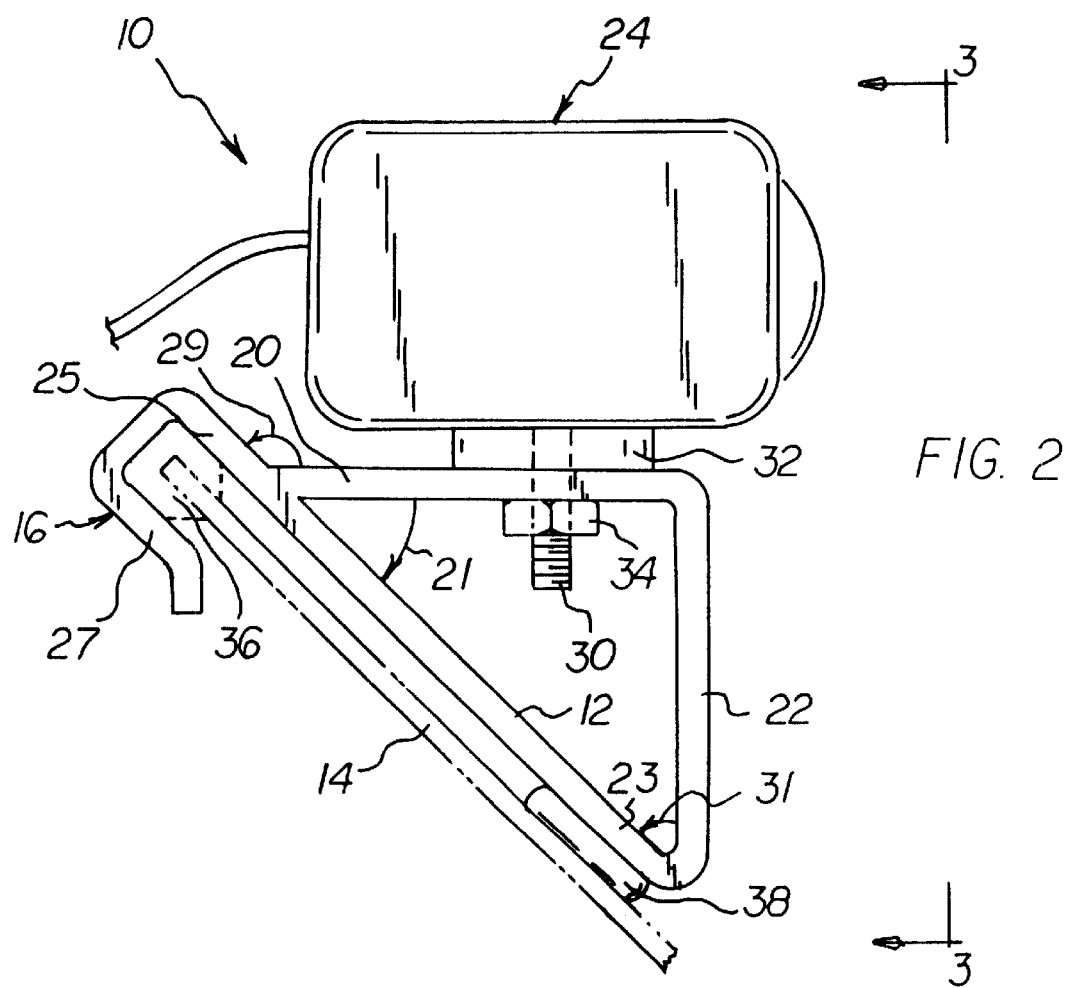
FIG. 2 is an enlarged side view of the embodiment of the invention shown in FIG. 1.
Figure 3:
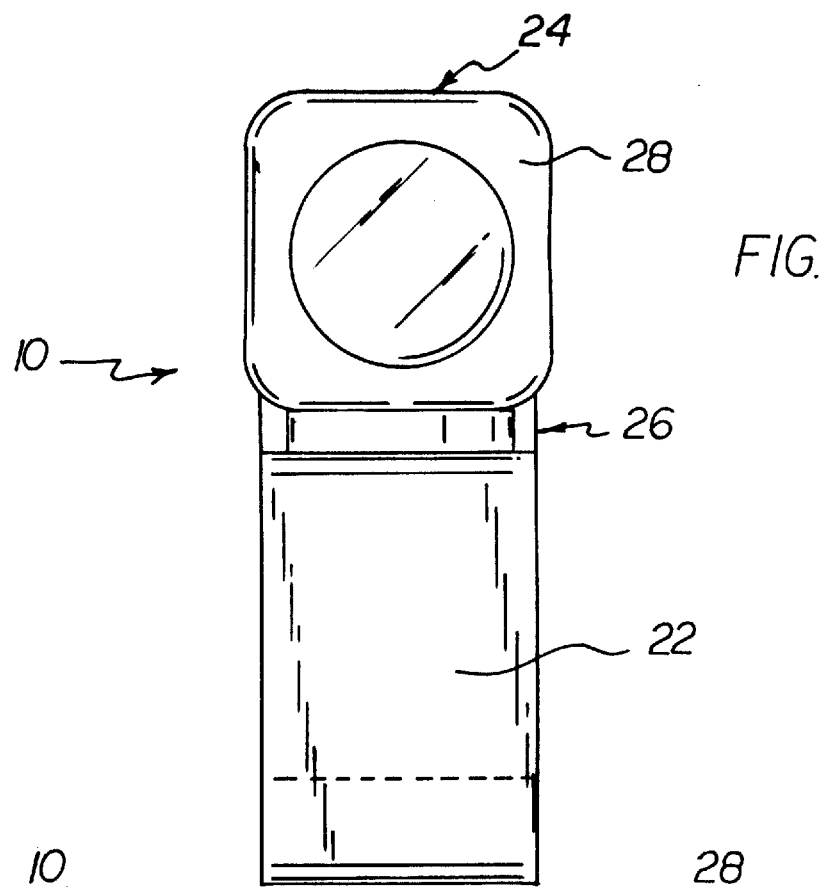
FIG. 3 is a front view of the embodiment of the boat windshield light and support apparatus of FIG. 2 taken along line 3—3 thereof.
Figure 4:
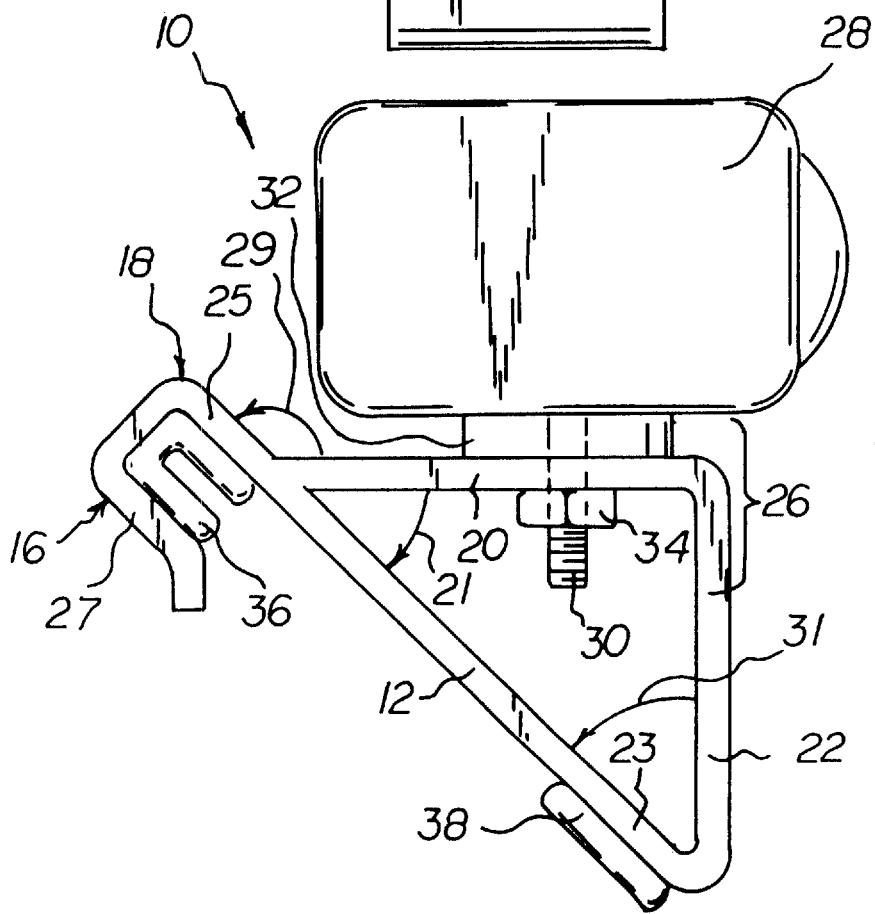
FIG. 4 is a side view of the embodiment of the invention shown in FIG. 2 removed from the boat windshield.

With reference to the drawings, a new and improved boat windshield light and support apparatus embodying the principles and concepts of the present invention will be described.

Generally, a light support apparatus 10 is provided for use on a windshield 14 oriented at a windshield slope angle 15 with respect to the horizontal 17 and includes a bracket member 16 which has a top bracket portion 25 and a bottom bracket portion 27. A horizontal support member 20 is connected to the top bracket portion 25 at a bracket-to-support angle 29. A vertical support member 22 is connected to the horizontal support member 20, and a windshield supported foot member 23 is connected to the vertical support member 22 at a foot-to-vertical support angle 31. The horizontal support member 20 includes a fastener reception channel 40. The bracket member 16, the horizontal support member 20, the vertical support member 22, and the windshield supported foot member 23 can be made from a single piece of plastic material.

It is recalled from the mathematical subject of geometry that two angles are supplementary when their sum equal 180 degrees. In addition, two angles are complementary when their sum equals 90 degrees. Preferably, the bracket-to-support angle 29 is substantially supplementary to the windshield slope angle 15, and the foot-to-vertical support angle 31 is substantially complementary to the windshield slope angle 15. Preferably, the orientation angle between the horizontal support member 20 and the vertical support member 22 is a right angle. Preferably, the top bracket portion 25 and the bottom bracket portion 27 are resilient jaw members. A light assembly 24 is connected to the horizontal support member 20.

As shown with the embodiments of the invention in FIGS. 7–11, the windshield supported foot member 23 is relatively short and does not extend up to the bracket member 16. In contrast, with the embodiments of the invention shown in FIGS. 1–6, the windshield supported foot member 23 is extended by a hypotenuse portion 12 up to the bracket member 16.

More specifically with respect to FIGS. 1–4 and 6, there is shown a first embodiment of the boat windshield light and support apparatus of the invention. In this respect, a light support apparatus 10 is provided for use on a windshield 14 oriented at a windshield slope angle 15 with respect to the horizontal 17. The light support apparatus 10 includes a hypotenuse portion 12 that is supported by the windshield 14. The hypotenuse portion 12 extends from the windshield supported foot member 23 to a bracket member 16 located at the top end of the hypotenuse portion 12.

As shown in FIGS. 1–4, 6, and 7–11, the bracket member 16 includes planar outer surfaces and planar inner surfaces, and the bracket-retained cushion 36 is C-shaped, supported by the planar inner surfaces.

Figure 5:
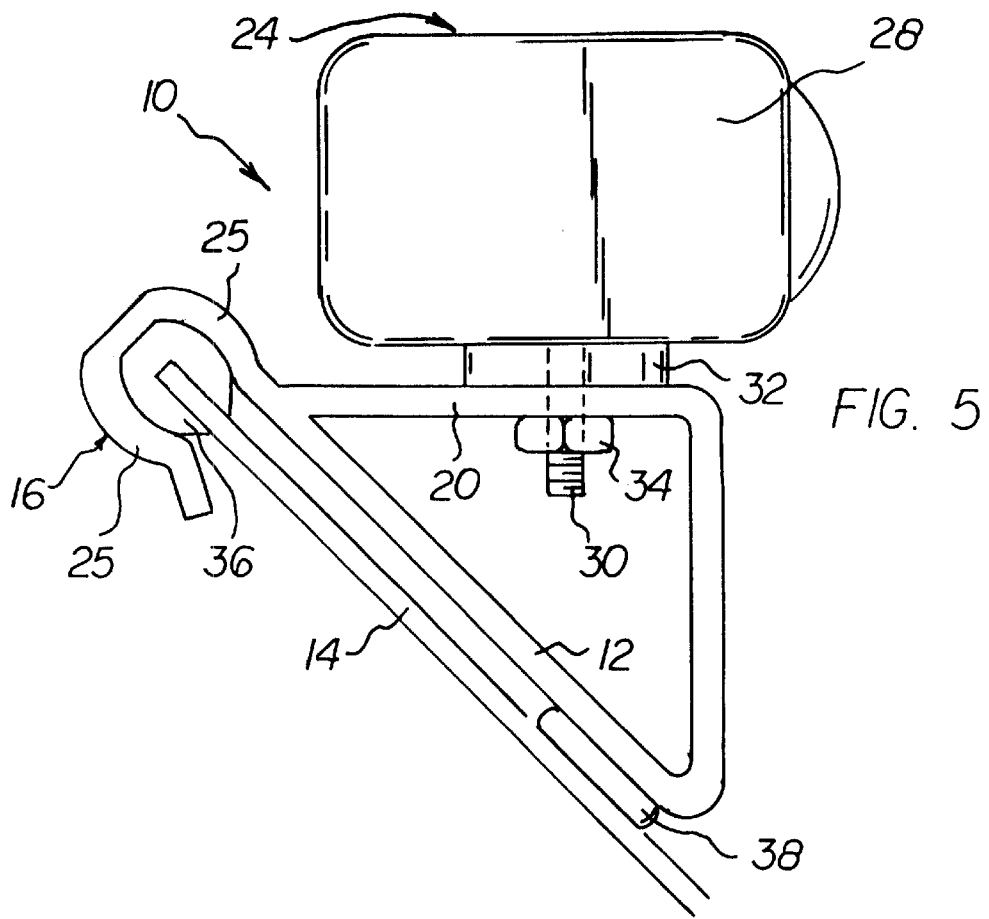
FIG. 5 is an enlarged side view of a second embodiment of the invention installed on a boat windshield.
Figure 6:
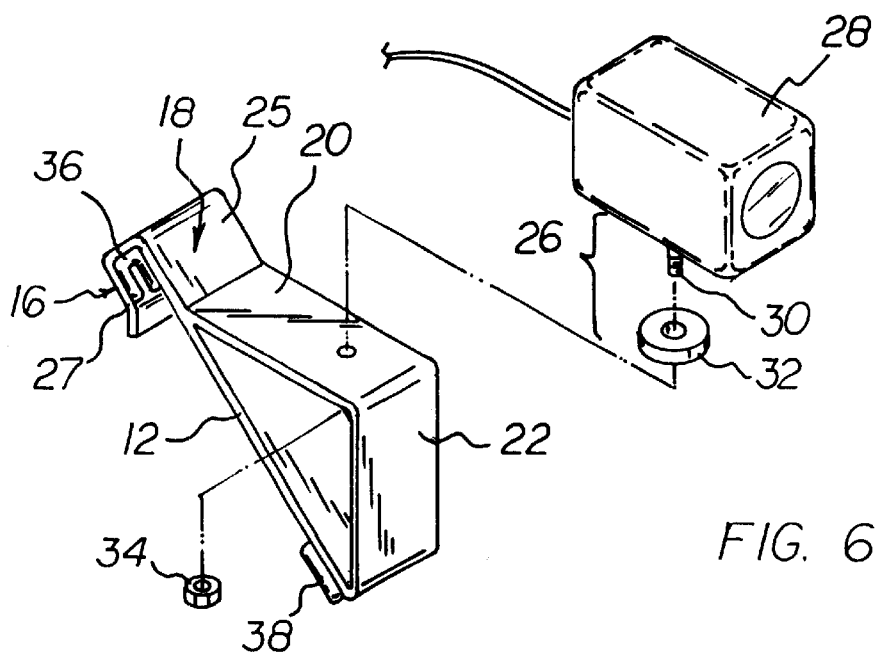
FIG. 6 is an exploded perspective view of the embodiment of the invention shown in FIGS. 1–4.

Turning to FIG. 5, a second embodiment of the invention is shown. Reference numerals are shown that correspond to like reference numerals that designate like elements shown in the other figures. In addition, the bracket member 16 includes convex outer surfaces and concave inner surfaces, and the bracket-retained cushion 36 is bulbous in shape, supported by the concave inner surfaces.

To use the light and light support apparatus of the invention shown in FIGS. 1–6, the bracket-retained cushion 36 can be placed over the top edge of the windshield 14 of a boat 11 such as shown in FIG. 1. Then, the foot-to-windshield cushion 38 rests upon a portion of the top surface of the windshield 14, and the foot-to-windshield cushion 38 is sandwiched between the windshield 14 and the windshield supported foot member 23.

As shown in the FIGS. 1–6, the horizontal-support-orientation angle 21 and the windshield slope angle 15 are approximately 30 angular degrees. As a result, the hypotenuse portion 12, the horizontal support member 20, and the vertical support member 22 form a 30-60-90 right triangle. Moreover, since the horizontal-support-orientation angle 21 and the windshield slope angle 15 are substantially equal, the lamp unit 28 is oriented in a horizontal orientation.

By using the light swivel unit 26, the lamp unit 28 can be rotated approximately 360 angular degrees around the swivel bolt 30. When this is done, the lamp unit 28 rotates on the bearing member 32 which is sandwiched between the lamp unit 28 and the horizontal support member 20. The lock nut 34 and the swivel bolt 30 keep the light swivel unit 26 secured onto the horizontal support member 20.

By using the light support apparatus 10 and the light assembly 24 of the invention, one need not alter the hull or the deck of a boat 11 to support a light assembly 24. In addition, one need not personally hold a light while the boat is operating.

Use of the embodiments of the invention shown in FIGS. 7–11 is substantially the same as for the embodiments of the invention shown in FIGS. 1–6. To use the embodiments of the invention, the swivel bolt 30 is inserted through the fastener reception channel 40 for attaching a light assembly 24 to a horizontal support member 20.

Figure 7:
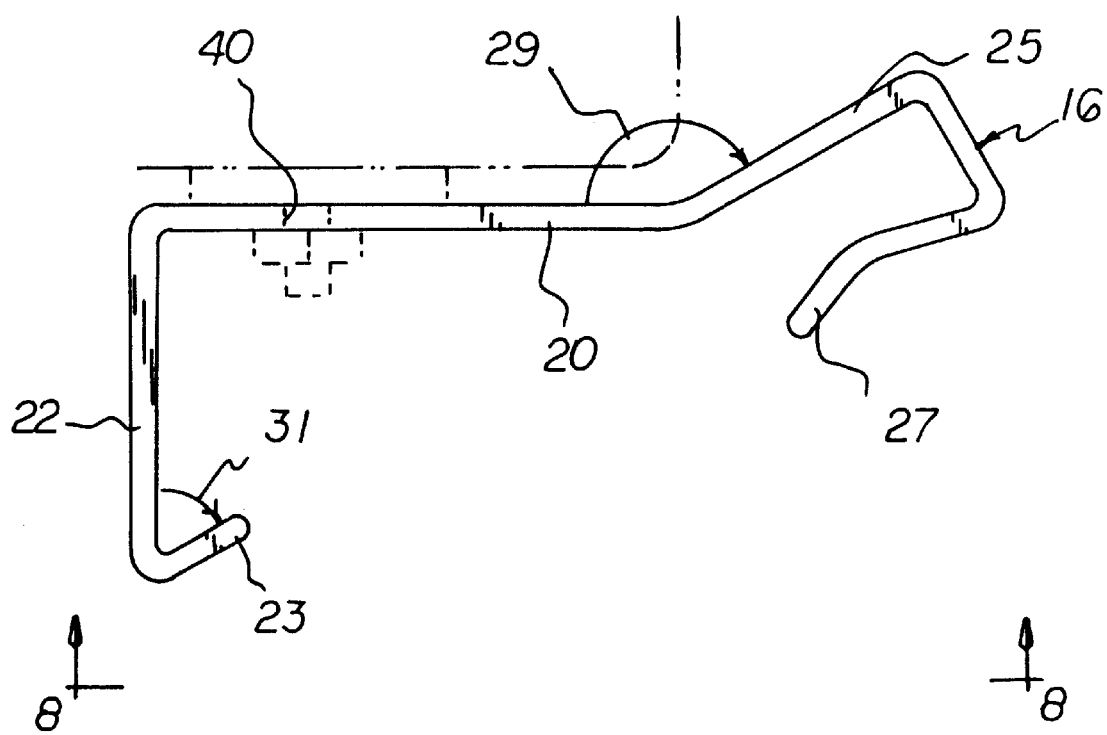
FIG. 7 is a side view of a third embodiment of the invention.
Figure 8:
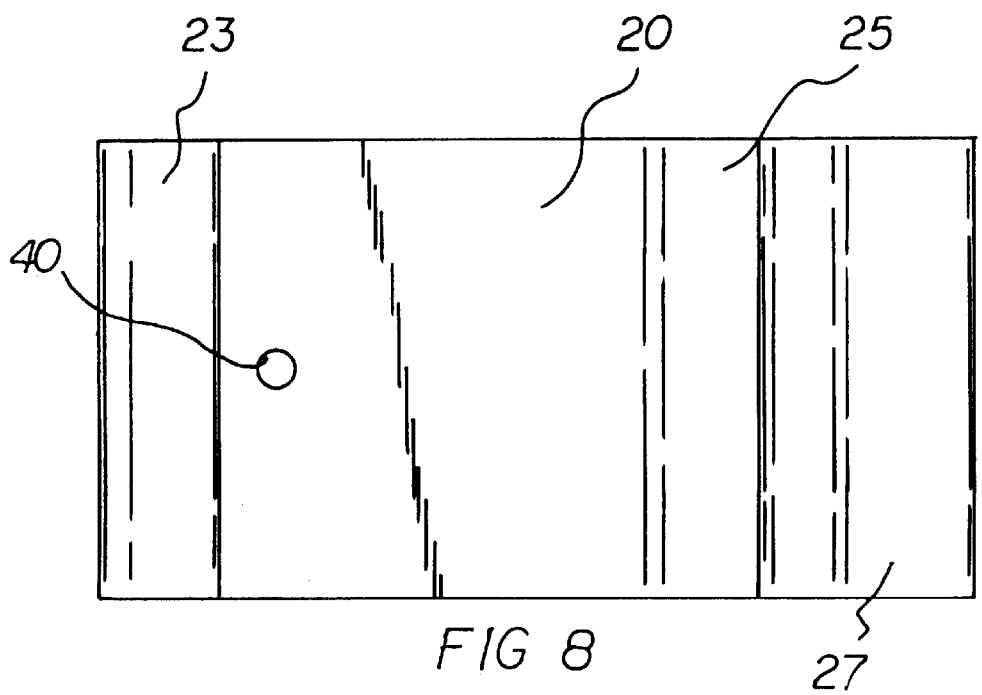
FIG. 8 is a bottom view of the embodiment of the invention of FIG. 7 taken along line 8—8 thereof.
Figure 11:
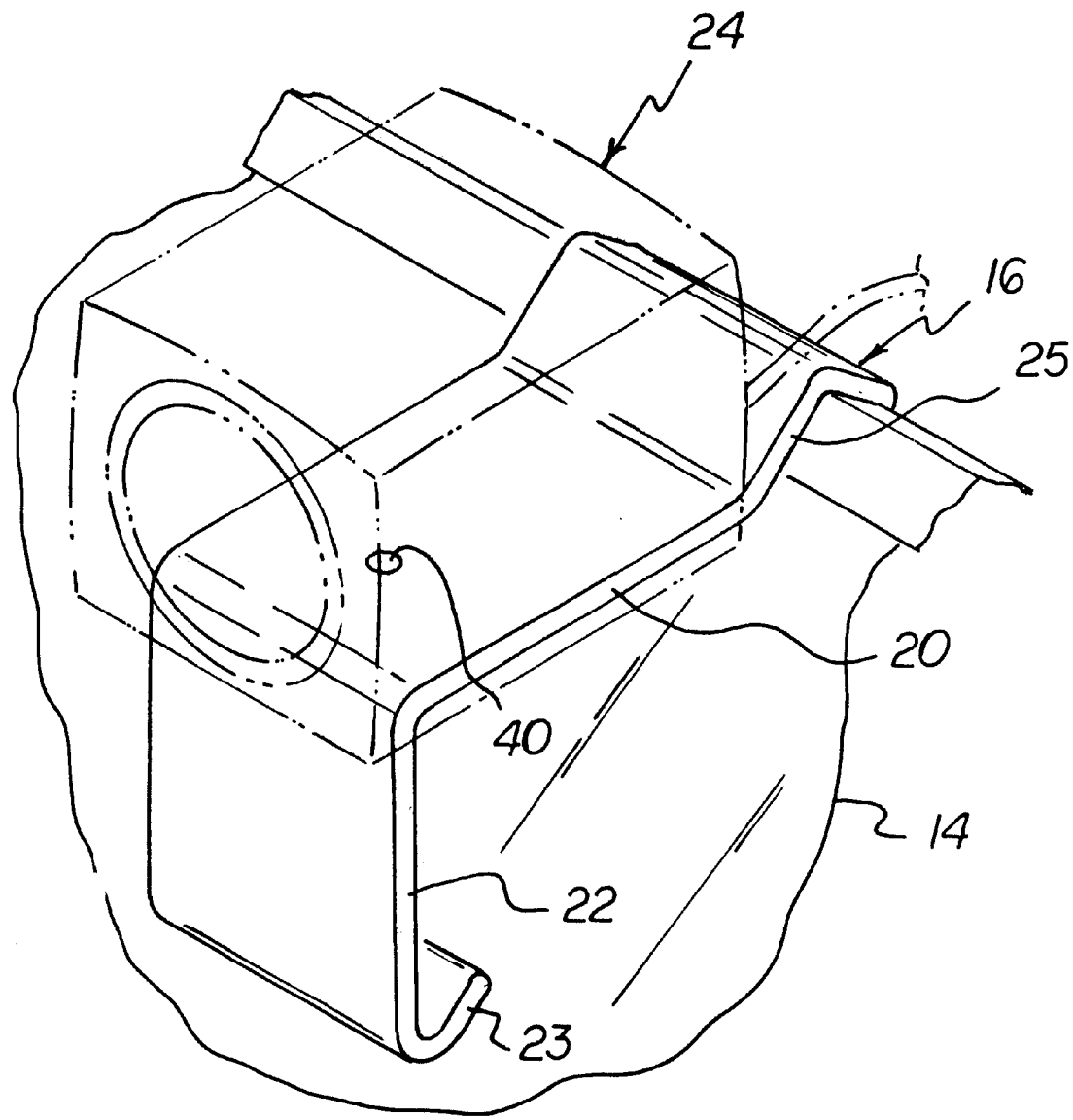
FIG. 11 is a perspective view of the embodiment of the invention of FIG. 7 installed on a windshield and supporting a light assembly.

A comparison of the embodiments of the light support apparatuses 10 of invention in FIGS. 7 and 9 is useful. The bracket-to-support angle 29 in the embodiment of FIG. 7 is greater than the bracket-to-support angle 29 in the embodiment of FIG. 9. The length of the horizontal support member 20 in the embodiment of FIG. 7 is greater than the length of the horizontal support member 20 in the embodiment of FIG. 9. The length of the vertical support member 22 in the embodiment of FIG. 7 is less than the length of the vertical support member 22 in the embodiment of FIG. 9. The foot-to-vertical support angle 31 in the embodiment of FIG. 7 is greater than the foot-to-vertical support angle 31 in the embodiment of FIG. 9. The variations discussed above are related to specific windshield slope angles 15 which are present on specific windshields 14 in specific boats 11. The variations are also related to specific light assemblies 24 that are supported by the specific light support apparatuses 10 of the invention.

The components of the boat windshield light and support apparatus of the invention can be made from inexpensive and durable metal and plastic materials. Preferably, as indicated above, the light support apparatus 10 of the present invention can be economically manufactured by molding same in a known manner as a unitary plastic article.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved boat windshield light and support apparatus that is low in cost, relatively simple in design and operation, and which may advantageously be used on a windshield that has an acute windshield slope angle. With the invention, a boat windshield light and support apparatus provides for mounting on the top of a boat windshield that has an acute windshield slope angle. With the invention, a boat windshield light and support apparatus is provided which is formed from a single piece of plastic material. With the invention, a boat windshield light and support apparatus is provided which has a swivel for a light assembly. With the invention, a boat windshield light and support apparatus is provided which includes a bracket member which has resilient clamping portions.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application.

Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A light support apparatus for use on a windshield oriented at a windshield slope angle with respect to the horizontal, comprising:

a bracket member which includes a top bracket portion and a bottom bracket portion, a horizontal support member connected to said top bracket portion at a bracket-to-support angle, a vertical support member connected to said horizontal support member, and a windshield supported foot member connected to said vertical support member at a foot-to-vertical support angle.

2. The apparatus of claim 1 wherein:

said bracket-to-support angle is substantially supplementary to the windshield slope angle, and said foot-to-vertical support angle is substantially complementary to said windshield slope angle.

3. The apparatus of claim 1 wherein said horizontal support member includes a fastener reception channel.

4. The apparatus of claim 1 wherein said top bracket portion and said bottom bracket portion are resilient jaw members.

5. The apparatus of claim 1 wherein an orientation angle between said horizontal support member and said vertical support member is a right angle.

6. The apparatus of claim 1, further including:

a hypotenuse portion connected between said windshield supported foot member and said bracket member.

7. The apparatus of claim 6 wherein said hypotenuse portion is oriented to said horizontal support member at a horizontal-support-orientation angle which is substantially equal to the windshield slope angle.

8. The apparatus of claim 1, further including:

a light assembly connected to said horizontal support member.

9. The apparatus of claim 8 wherein said light assembly includes:

a light swivel unit connected to said horizontal support member, and a lamp unit connected to said light swivel unit.

10. The apparatus of claim 9 wherein said light swivel unit includes:

a swivel bolt connected to said lamp unit, a bearing member retained on said swivel bolt and located between said lamp unit and said horizontal support portion, and a lock nut retained on said swivel bolt distal to said horizontal support member such that said horizontal support member is located between said lock nut and said bearing member.

11. The apparatus of claim 1, further including:

a windshield supported foot-to-windshield cushion supported by a bottom surface of said windshield supported foot member.

12. The apparatus of claim 1, further including:

a bracket-retained cushion supported inside said bracket member, wherein said bracket-retained cushion receives an edge of the windshield.

* * * * *